United States Patent [19]

Summerville

[11] 3,711,544

[45] Jan. 16, 1973

[54] HEAT RECOVERY IN UREA SYNTHESIS

[75] Inventor: Robert N. Summerville, Cranford, N.J.

[73] Assignee: The Lummus Company, Bloomfield, N.J.

[22] Filed: April 20, 1970

[21] Appl. No.: 30,131

[52] U.S. Cl..................260/555 A, 203/27, 203/14, 203/42, 203/79, 203/88
[51] Int. Cl..............................................C07c 127/04
[58] Field of Search...................................260/555 A

[56] References Cited

FOREIGN PATENTS OR APPLICATIONS

44/18285  11/1969  Japan.................................260/555 R

Primary Examiner—Bernard Helfin
Assistant Examiner—Michael W. Glynn
Attorney—Marn & Jangarathis

[57] ABSTRACT

Heat recovery in a urea synthesis in which heat generated during the urea synthesis is employed for providing steam which is used for removing dissolved gases from a urea solution.

9 Claims, 4 Drawing Figures

INVENTOR.
Robert N. Summerville

BY

*Marn & Jangarathis*

ATTORNEYS

INVENTOR.
Robert N. Summerville

HEAT RECOVERY IN UREA SYNTHESIS

This invention is directed to the synthesis of urea and more particularly to a method for recovering heat in the synthesis of urea.

Urea is commercially produced by reacting ammonia and carbon dioxide at elevated temperatures and pressures. The reaction proceeds in two steps as illustrated by the following equations:

(1) $2NH_3 + CO_2 \rightleftharpoons NH_2COONH_4$ (2) $NH_2COONH_4 \rightleftharpoons NH_2CONH_2 + H_2O$ The reaction illustrated by equation 1 is rapid whereas the conversion in the reaction illustrated by equation 2 is limited by reaction rate as well as equilibrium and thus, an effluent from a urea autoclave contains ammonium carbamate as well as urea and unreacted carbon dioxide and ammonia. In general, the autoclave effluent is passed to a series of decomposition zones wherein the ammonium carbamate contained in the effluent is decomposed into ammonia and carbon dioxide which are removed from the urea solution in admixture with unreacted carbon dioxide and ammonia for recovery and return to the urea autoclave.

Generally, the operation for recovering ammonia and carbon dioxide includes an absorption step, either absorption of both gases or selective absorption of one gas, carbon dioxide, and in such an absorption step heat of absorption is liberated. In order to reduce the overall utility requirements of the synthesis, it would be highly desirable to recover this heat of absorption and any other heat liberated during the overall synthesis.

Accordingly, an object of this invention is to effectively recover heat in the synthesis of urea.

Another object of the invention is to effectively recover heat generated in the absorption operation of the urea synthesis.

A further object of this invention is to effectively recover heat generated in the urea recovery operation.

Still another object of this invention is to effectively recover heat and combine operations in the urea synthesis.

These and other objects will become more readily apparent when reading the following detailed description of the invention with reference to the accompanying drawings in which like reference numerals designate like parts and wherein.

It is to be understood that only those portions of the overall urea synthesis that are necessary for understanding the heat recovery process of the invention have been described. Thus, the specific details of the overall synthesis form no part of the invention and may be performed in any one of a wide variety of ways.

Figure 1:
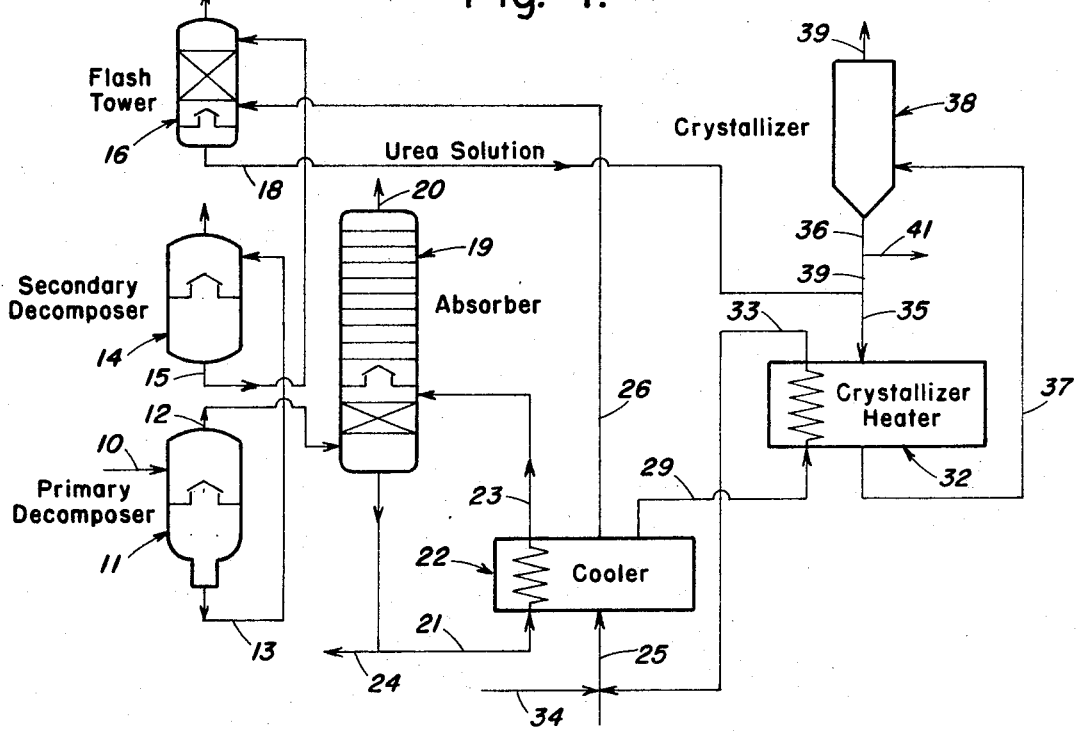
FIG. 1 is a flow diagram of one embodiment of the process of the invention.

Referring to FIG. 1, an effluent from a urea autoclave (not shown) comprising an aqueous urea solution in admixture with ammonium carbamate and unreacted ammonia and carbon dioxide is introduced through line 10 into a primary decomposer 11 operating at an elevated temperature and pressure. In the decomposer 11, the ammonium carbamate is decomposed into ammonia and carbon dioxide and these gaseous products are withdrawn in admixture with some water vapor and unreacted carbon dioxide and ammonia through line 12. An aqueous urea solution containing ammonium carbamate, carbon dioxide, and ammonia is withdrawn from the primary decomposer 11 through line 13 and introduced into a secondary decomposer 14 operating at a pressure lower than the primary decomposer 11 for further decomposition of ammonium carbamate and removal of gaseous products. An aqueous urea solution containing some carbon dioxide and ammonia is withdrawn from the secondary decomposer 14 through line 15 and introduced into a flash tower 16 operating at a pressure lower than the secondary decomposer 14 for further removal of gaseous products. An aqueous urea solution is withdrawn from the flash tower 16 through line 18 for further treatment as hereinafter more fully described.

The gaseous effluent withdrawn from the primary decomposer 11 through line 12 is introduced into an absorber 19 and contacted therein with an absorbing medium, such as an aqueous solution of ammonia and ammonium carbamate, which preferentially absorbs carbon dioxide and water. The unabsorbed ammonia is withdrawn from the absorber 19 through line 20 and recycled to the urea autoclave (not shown). The enriched absorption medium containing absorbed carbon dioxide is withdrawn from the absorber 19 at a temperature higher than the temperature at which the lean absorption medium was introduced because of the heat generated by both the absorption of carbon dioxide and the reaction of carbon dioxide and ammonia to form ammonium carbamate, and a first portion is passed through line 24 for return to the urea autoclave (not shown). A second portion of the absorption medium withdrawn from the absorber 19 is introduced through line 21 into cooler 22 and passed therein in indirect heat transfer with a coolant, such as water, introduced through line 25. The water introduced into cooler 22 through line 25 is at a temperature and pressure such that the heat transferred from the absorption medium will convert the water to saturated steam. A cooled absorption medium is withdrawn from cooler 22 through line 23 and returned to the absorber 19.

A first portion of the steam generated in cooler 22 is withdrawn through line 26 and introduced into the flash tower 16 for stripping carbon dioxide and ammonia from the aqueous urea solution introduced into the flash tower 16 through line 15. A second portion of the steam generated in cooler 22 is withdrawn through line 29 and introduced into a crystalizer heater 32 to vaporize water and crystallize urea from a urea solution as hereinafter more fully described. Steam condensate is withdrawn from crystallizer heater 32 through line 33 and admixed with makeup condensate introduced through line 34 for introduction into cooler 22 through line 25.

The aqueous urea solution withdrawn from the flash tower 16 through line 18 is combined in line 35 with a portion of a urea slurry withdrawn from a crystalizer 38 through line 36. The mixture in line 35 is passed through crystalizer heater 32 in indirect heat transfer with the steam introduced therein through line 29 to vaporize water and crystallize urea therefrom. A steam-urea slurry mixture is withdrawn from crystalizer heater 32 through line 37 and introduced into crystalizer 38 to separate steam therefrom. A steam overhead is withdrawn from crystalizer 38 through line 39 and a urea slurry is withdrawn therefrom through line 36, with a portion thereof being passed through line 41 for further processing. The remaining portion of the urea slurry in line 36 is combined with the urea solution in line 18 in line 35.

It should be readily apparent that for effective operation of the heat recovery process, the cooling requirements of the absorber 19 must be balanced with the heating requirements of the crystalizer heater 32. This may be accomplished, for example, by controlling the bottoms temperature of the absorber 19 by regulating the reflux rate (not shown) of ammonia in line 20 to the absorber 19. Alternatively, additional condensate can be added to either line 35 or cooler 22 to achieve the aforementioned heat balance between the absorber 19 and the crystalizer heater 32. In the latter system, the condensate would be obtained by condensing a portion of the steam produced in the cooler 22 in a separate water cooled condenser (not shown).

As an alternative to the above embodiment, instead of using the steam generated in cooler 22 to meet the heat requirements of crystalizer heater 32, a portion of the absorption medium in line 21 may be used to indirectly heat the urea slurry passing through the crystalizer heater 32. This would be similar to the embodiment illustrated in FIG. 4, hereinafter more fully described, wherein the absorption medium is employed to meet the heat requirements of a urea concentrator. In this alternative, the steam circulating system from cooler 22 to crystalizer heater 32 would be omitted.

Figure 2:
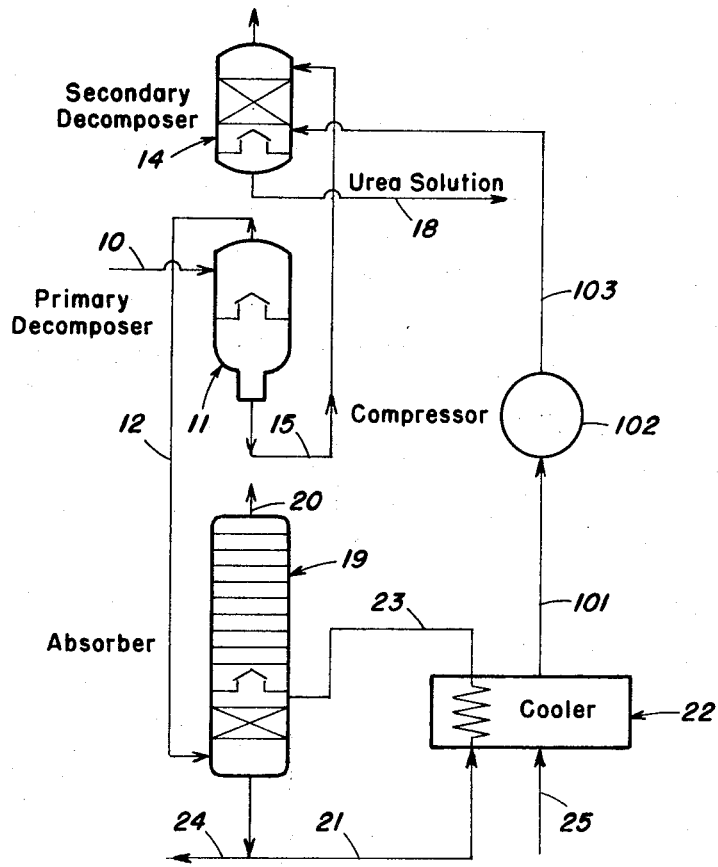
FIG. 2 is a flow diagram of another embodiment of the process of the invention.

In another embodiment, illustrated in FIG. 2, there is provided a primary decomposer 11', a secondary decomposer 14', an absorber 19', and a cooler 22' which operate in the same manner as FIG. 1. In this embodiment, however, at least a portion of the steam produced in cooler 22' is withdrawn through line 101, passed to a compressor 102 and compressed therein to the pressure at which the secondary decomposer 14' operates, such as but not limited to atmospheric pressure. Compressed steam is withdrawn from compressor 102, passed through line 103 to the secondary decomposer 14' and utilized therein for stripping ammonia and carbon dioxide from the urea solution introduced into the secondary decomposer 14' through line 13'. Similarly to the embodiment of FIG. 1, the cooling requirements of the absorber 19' and the heating requirements in the secondary decomposer 14' may be balanced by controlling the bottoms temperature of the absorber 19' by regulating the reflux rate (not shown) of ammonia in line 20' to the absorber 19'. The introduction of steam into the secondary decomposer 14' eliminates the flash tower generally utilized for stripping carbon dioxide and ammonia from the urea solution withdrawn from the secondary decomposer 14' and thus the urea solution withdrawn from decomposer 14' may be passed directly to a urea recovery zone. A flash drum (not shown) may be used for cooling the urea effluent from the decomposer 14' prior to introduction into the urea recovery zone.

It should be readily apparent that in the operation of the embodiment illustrated in FIG. 2, a portion of the steam produced in cooler 22' may be passed through line 104 to be used in crystallizing urea solution, as described more fully in the description of the embodiment illustrated in FIG. 1.

Figure 3:
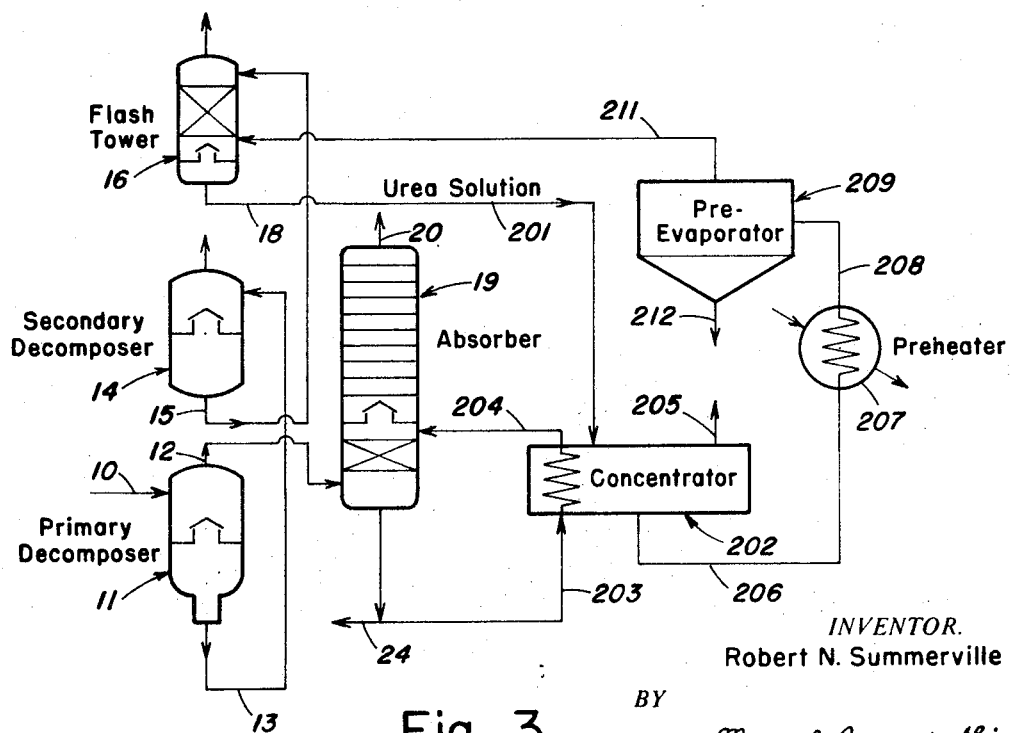
FIG. 3 is a flow diagram of a further embodiment of the process of the invention.

In a further embodiment, illustrated in FIG. 3, there is provided a primary decomposer 11'', a secondary decomposer 14'', a flash tower 16'', and an absorber 19'' which operate in the same manner as FIG. 1. In this embodiment, however, the aqueous urea solution withdrawn from the flash tower 16'' is introduced into a concentrator 202 through line 201 and passed therein in an indirect heat transfer relationship with enriched absorption medium introduced into concentrator 202 through line 203 from the absorber 19. The absorption medium flowing through concentrator 202 transfers heat of absorption to the urea solution contained therein, evaporating water which is withdrawn through line 205. A cooled absorption medium is withdrawn from concentrator 202 through line 204 and returned to the absorber 19. The cooling requirements of the absorber 19'' and the heating requirements of the concentrator 202 may be balanced by either controlling the bottoms temperature of the absorber 19'', as previously described, or by returning condensate as makeup water to the concentrator 202. A partially concentrated urea solution is withdrawn from concentrator 202 through line 206 and passed through preheater 207 and line 208 to pre-evaporator 209. In pre-evaporator 209, the urea solution is further concentrated by conversion of water to steam which is withdrawn through line 211 and a further concentrated urea solution is withdrawn from preevaporator 209 through line 212 for further processing. The steam withdrawn from preevaporator 209 through line 211 is introduced into the flash tower 16'' and utilized therein for stripping carbon dioxide and ammonia from the aqueous urea solution introduced into the flash tower 16'' through line 15''. As an alternative, the steam in line 211 may be passed in an indirect heat transfer relationship with the urea solution in the flash tower 16'', resulting in a more concentrated urea solution being withdrawn from the flash tower 16'' through line 18''. As another alternative, instead of using the steam withdrawn from pre-evaporator 209 in the flash tower 16'', the steam withdrawn from concentrator 202 through line 205 may be passed directly to the flash tower 16''. This procedure, however, necessitates using pressures lower than the optimum pressures for the concentration-flash tower system and is generally less preferred.

Figure 4:
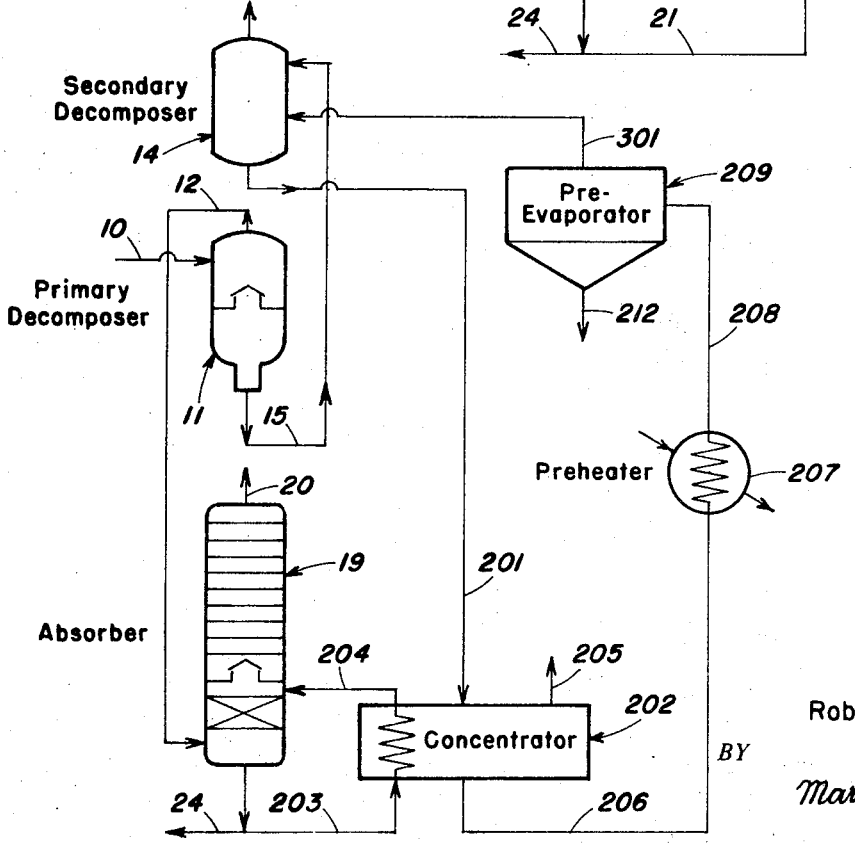
FIG. 4 is a flow diagram of still another embodiment of the process of the invention.

In still another embodiment, illustrated in FIG. 4, there is provided a primary decomposer 11''', a secondary decomposer 14'''', an absorber 19'''', a concentrator 202', a preheater 207', and a pre-evaporator 209' which operate in the same manner as FIG. 3. In this embodiment, however, the steam withdrawn from pre-evaporator 209' is passed through line 301 to the secondary decomposer 14'''' and utilized therein for stripping ammonia and carbon dioxide from the aqueous urea solution introduced through line 13'''. The secondary decomposer 14'''' is operated at close to atmospheric pressure, thus eliminating the necessity for compressing the steam in line 301. The introduction of steam directly into the secondary decomposer 14'''' eliminates the flash tower generally utilized for stripping ammonia and carbon dioxide from the aqueous urea solution withdrawn therefrom.

The following conditions illustrate the process of the invention but its scope is not to be limited thereby. The temperatures and pressures included within parenthesis are illustrative of preferred temperature and pressure ranges, respectively.

EMBODIMENT OF FIG. 1

| Line | Temp. °F. | pressure psia. | Flow rate lb./hr. |
|---|---|---|---|
| 21 | 212 (200-220) | 255 (240-270) | 500,000 |
| 23 | 195 (180-200) | 255 (240-270) | 500,000 |
| 25 | 180 (160-190) | 7.5 (4.7-9.3) | 5,700 |
| 26 | 180 (160-190) | 7.5 (4.7-9.3) | 700 |
| 29 | 180 (160-190) | 7.5 (4.7-9.3) | 5,700 |
| 33 | 180 (160-190) | 7.5 (4.7-9.3) | 5,700 |
| 35 | 138 (120-150) | 2.0 (1.0-2.5) | 2,000,000 |
| 37 | 142 (125-155) | 2.0 (1.0-2.5) | 2,500,000 |

EMBODIMENT OF FIG. 2

| Line | Temp. °F. | Pressure psia. | Flow Rate lb./hr. |
|---|---|---|---|
| 21' | 200-220 | 240-270 | 500,000 |
| 23' | 180-200 | 240-270 | 500,000 |
| 25' | 70-200 | 4.0-16.0 | 5,700 |
| 101 | 160-190 | 4.7-9.3 | 5,700 |
| 103 | 200-350 | 10-30 | 1,000 |

EMBODIMENT OF FIG. 3

| Line | Temp. °F. | Pressure psia. | Flow Rate lb./hr. |
|---|---|---|---|
| 201 | 180 (170-195) | 5.0 (4.5-6.5) | 21,000 |
| 203 | 220 (200-230) | 260 (250-280) | 688,000 |
| 204 | 210 (195-225) | 260 (250-280) | 688,000 |
| 206 | 203 (180-210) | 5.1 (4.5-6.5) | 17,200 |
| 208 | 257 (245-265) | 5.9 (5.0-6.5) | 17,200 |
| 211 | 257 (245-265) | 5.9 (5.0-6.5) | 1,000 |

EMBODIMENT OF FIG. 4

| Line | Temp. °F. | Pressure psia. | Flow Rate lb./hr. |
|---|---|---|---|
| 201' | 180 (170-195) | 5.0 (4.5-6.5) | 21,000 |
| 203' | 220 (200-230) | 260 (250-280) | 688,000 |
| 204' | 210 (195-225) | 260 (250-280) | 688,000 |
| 206' | 203 (180-210) | 5.1 (4.5-6.5) | 17,200 |
| 208' | 257 (245-265) | 5.9 (5.0-6.5) | 17,200 |
| 301' | 257 (245-265) | 5.9 (5.0-6.5) | 1,000 |

The process of this invention is extremely effective for recovering heat in the synthesis of urea. The use of the heat absorption liberated in the absorber for providing steam and concentrating aqueous urea solutions greatly reduces the steam makeup in the process, thus reducing the overall cost of the urea synthesis. In addition, a savings is realized by eliminating the flash tower by compressing steam generated in the system and utilizing it to strip gaseous products in the decomposition zone.

Obviously many modifications and variations of the present invention are possible in the light of the above teachings. It is therefore to be understood that within the scope of the appended claims, the invention may be practiced otherwise as specifically described.

What is claimed is:

1. In a urea synthesis wherein carbon dioxide and ammonia are reacted to produce urea, the reaction product is passed to a first decomposition zone wherein gases are removed and a urea solution is recovered, the gases removed are contacted with an absorption medium in an absorption zone, and the urea solution from the first decomposition zone is passed to a second decomposition zone to effect further removal of gases, and a urea solution is passed from the second decomposition zone to a recovery zone for recovering urea, a process for recovering heat comprising
   a. passing absorption medium containing absorbed gas from the absorption zone in heat transfer relationship with water to produce steam from said water; and
   b. compressing at least a portion of said steam and introducing said compressed steam into the second decomposition zone to contact the urea solution to strip gases therefrom.

2. The process of claim 1 wherein a portion of the steam produced in (a) is passed in heat transfer relationship with the urea solution from the decomposition zone in the recovery zone.

3. The process of claim 1 wherein steam generated in step (a) is at a temperature from about 160°F. to about 190°F. and the compressed steam in step (b) is at a temperature from about 200°F. to about 350°F.

4. In a urea synthesis wherein carbon dioxide and ammonia are reacted to produce urea, the reaction product is passed to a first decomposition zone wherein gases are removed and an aqueous urea solution is recovered, the gases removed are contacted with an absorption medium and the aqueous urea solution from the first decomposition zone is passed to a second decomposition zone to effect further removal of gases and the aqueous urea solution from the second decomposition zone is passed to a flash zone to effect still further removal of gases, and the aqueous urea solution from the flash zone is passed to a recovery zone for recovering urea by converting the water to steam, a method for recovering heat comprising:
   introducing the steam produced in the recovery zone into the flash zone to contact the aqueous urea solution and strip gases therefrom.

5. The process of claim 4 wherein the recovery zone comprises first and second concentration zones and the steam produced in the second concentration zone is passed to the flash zone.

6. The process of claim 5 wherein the absorption medium withdrawn from the absorption zone containing absorbed gas is passed in heat transfer relationship with the aqueous urea solution in the first concentration zone to provide heat requirements for concentration.

7. The process of claim 6 wherein the steam introduced into the flash zone is at a temperature from about 245° to about 265°F. and a pressure from about 5.0 to about 6.5 psia.

8. In a urea synthesis wherein carbon dioxide and ammonia are reacted to produce urea, the reaction product is passed to a first decomposition zone wherein gases are removed and a urea solution is recovered, the gases removed are contacted with an absorption medium in an absorption zone, and the urea solution from the first decomposition zone is passed to a second decomposition zone to effect further removal of gases, and an aqueous urea solution is passed from the second decomposition zone to a recovery zone for recovering urea, a process for recovering heat comprising:

a. passing the absorption medium containing absorbed gas from the absorption zone in heat transfer relationship with said aqueous urea solution in a first concentration zone in the recovery zone to provide heat requirements for partial concentration of the aqueous urea solution; introducing the resulting partially concentrated urea solution into a second concentration zone in the product recovery zone to produce steam and, effect further concentration of the urea solution; recovering said steam from the second concentration zone; and introducing the recovered steam into the second decomposition zone to contact the urea solution and strip gases therefrom.

9. The process as defined in claim 8 wherein the second decomposition zone is operated at close to atmospheric pressure and the steam introduced therein is at a temperature from about 245° to about 265°F. and a pressure from about 5.0 to about 6.5 psia.

* * * * *